July 31, 1962     T. A. ST. CLAIR ET AL     3,047,298
GAS METER SEALING MEANS
Filed May 10, 1960

INVENTORS
Theodore A. St. Clair
BY Robert K. Fairchild

Johnson and Kline
ATTORNEYS

United States Patent Office 3,047,298
Patented July 31, 1962

3,047,298
GAS METER SEALING MEANS
Theodore A. St. Clair, Fairfield, and Robert K. Fairchild, Bridgeport, Conn., assignors, by mesne assignments, to Textron, Inc., Providence, R.I., a corporation of Rhode Island
Filed May 10, 1960, Ser. No. 28,097
8 Claims. (Cl. 277—4)

The present invention relates to a sealing means for sealing a rotating shaft, and more particularly to a sealing means for use in connection with gas meters to seal shafts projecting therefrom.

Heretofore, efforts have been made to seal the openings in gas meters through which a rotating shaft extends by the use of laminated sealing units comprising a plurality of metal washers having interposed therebetween felt or other similar material which upon being squeezed tended to spread in a radial direction to seal the shaft and the opening through which the shaft passed.

These have not been entirely satisfactory and for this reason pressures in the gas meters have been kept to a relatively low value.

The present invention overcomes these difficulties by providing a sealing means which effectively seals the shaft and opening in the meter casing, which is of simple construction, easy to operate, and which can be formed as a unit to be readily handled and used in new meters or to replace existing seals.

This is accomplished by providing a sealing unit having an O-ring surrounding the shaft and a second O-ring surrounding the outer surface of the unit, which O-rings are adapted to be compressed and deformed as the unit is put into place to form an effective constantly loaded resilient seal with the rotating shaft and a static seal with the housing.

Preferably, the seal of the present invention is made as a self-contained unit which can be readily stored and handled in assembled relation and can be quickly installed in new meters or as a replacement in existing meters.

The device of the present invention is of simple construction, is easy to assemble and is easy to operate.

Other features and advantages of the invention will be apparent from the specification and claims when considered in connection with the accompanying drawings in which:

Figure 1:
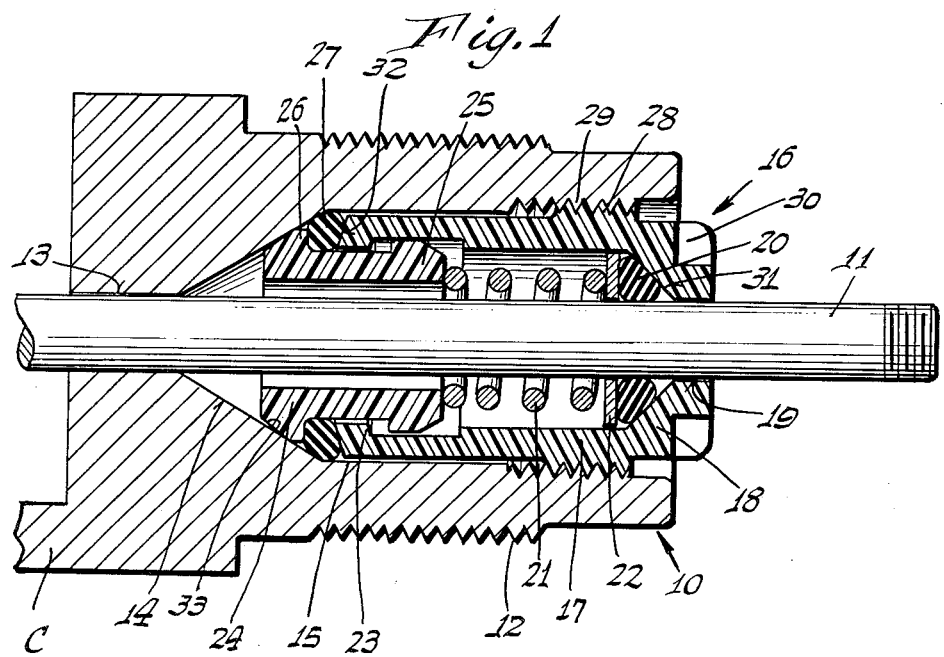
FIGURE 1 shows the seal installed and in sealing relation.

While the seal of the present invention may be used for various purposes, it has particular utility in sealing the rotating shaft, such as an index shaft, passing through the casing of a gas meter and the invention will be described in connection with this use.

As shown in the drawings, the usual bushing 10 on a gas meter casing C has a rotating shaft 11 passing therethrough to operate the usual index for the meter. While the bushing may be an integral part of the casing or threaded by threads 12 into an aperture in the casing, for the purpose of simplicity it is herein illustrated as a part of the casing. The bushing has at its inner end a bore 13 adapted to receive the shaft and is provided with an inner wall 14 connecting the bore 13 to an enlarged bore portion 15 in the bushing into which a sealing unit 16 of the present invention is adapted to be inserted.

As shown in the drawings, the sealing unit of the present invention comprises a sleeve 17 having a closed end 18 provided with a bore 19 to receive the shaft. Disposed within the sleeve is an O-ring or the like deformable annular member 20 of buna N or the like resilient material which is adapted to engage the inner surface of the closed end and surround the shaft. Within the sleeve is a spring 21 and, if desired, a washer 22 can be inserted between the end of the spring and the O-ring to distribute the pressure of the spring to the O-ring as will be described. The other or open end of the sleeve is provided with an inner shoulder 23.

Disposed within the open end of the sleeve is a plug 24 having a tapered bead 25 at its forward end. The plug which has a shaft-receiving bore is adapted to be inserted in the end of the sleeve with the bead snapping past the inner shoulder and interlocking the plug and sleeve together for limited relative longitudinal movement with the inner end of the plug engaging the spring and applying an initial pressure on the O-ring. Preferably, the sleeve and plug are molded from resilient plastic material such as Delrin, manufactured and sold by E. I. DuPont de Nemours & Co. which will permit the two parts to be snapped into assembled relation and held together to form a unit. If desired the plug can have an outwardly extending shoulder 26 to hold an O-ring 27 on the unit in position to be engaged by the end of the sleeve.

Figure 2:
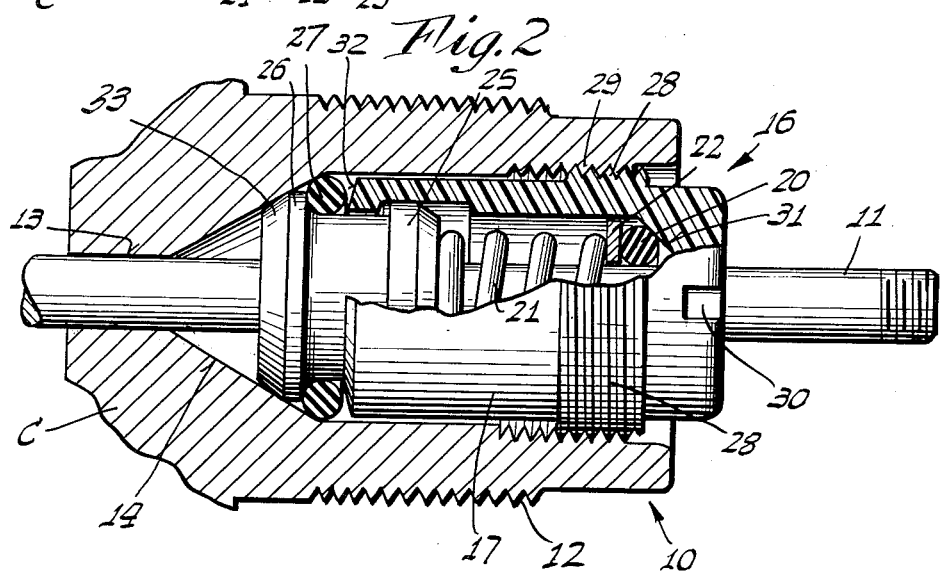
FIG. 2 shows the seal installed but prior to being put in sealing relation.

In order to form the seal of the present invention, the sealing unit 16, with the parts in normal position as shown in FIG. 2, is inserted over the end of the shaft and into the enlarged bore 15 of the bushing.

Means are provided for forcing the unit inwardly into sealing relation. While this may be done by any suitable means, it is preferred, in accordance with the present invention, to provide the sleeve with threads 28 which cooperate with the threads 29 (usually found in the bushing for compressing the former type of laminated seal). The end of the sleeve is provided with notches 30 to receive a spanner wrench or like tool for rotating the sleeve and moving it into position in which the unit produces its effective seal.

As the unit is threaded into the bore, the outer end of the plug engages the inner wall 14 in the bushing so that continued movement of the sleeve will cause longitudinal movement of the plug inwardly with respect to the sleeve, thus applying pressure to the spring 21 which causes the washer 22 to be resiliently pressed against the O-ring and clamp the same, with a uniformly distributed pressure, against the closed end of the sleeve. This causes the O-ring to be deformed, as shown in FIG. 1, and engage the rotating shaft to seal the same without unduly loading the shaft.

Preferably, as shown in the drawings, the inner surface 31 of the closed end of the sleeve is inclined toward the bore so that as the O-ring is deformed it spreads along the shaft to provide a longer sealing area. Also, as the plug moves inwardly to apply pressure to the spring, the O-ring 27 disposed between the shoulder 26 and the end of the sleeve is compressed and forced into engagement with the bore in the bushing to effectively produce a static seal between the unit and the bushing. If desired, the end of the sleeve can be inclined as shown at 32 to aid in forcing the O-ring outwardly during the deformation thereof to insure the seal with the bushing even though the surface in the bore may be rough or irregular.

In the preferred form of the invention the inner wall 14 of the bushing is inclined and the end 33 of the bushing is tapered so that the two surfaces act as a centering and controlling means for the inner end of the unit, thus insuring a more effective seal.

The seal of the present invention can be inserted as original equipment during the assembly of the meter or it can be inserted as a replacement seal. Inasmuch as the seal is obtained by the distortion of the O-rings, variations in shaft size and in the bore of the bushing as may be found in existing meters can be readily accommodated.

Variations and modifications may be made within the scope of the claims and portions of the improvements may be used without others.

We claim:

1. Means for sealing a gas meter casing having a rotatable shaft projecting therefrom comprising a bushing on the casing having a bore through which the shaft passes, said bore being of a diameter at the inner end to receive the shaft and being connected by an inner wall to an enlarged portion of the bore at the outer end to receive a sealing unit, said sealing unit comprising a sleeve adapted to fit within the enlarged bore and having a closed outer end provided with a bore of reduced diameter to engage the shaft, an O-ring within the sleeve engaging the closed end, a washer within the sleeve engaging the O-ring, a spring engaging the washer, a plug mounted in the other end of the sleeve for relative movement, and an O-ring surrounding the plug adjacent the end of the sleeve, said unit being inserted over the shaft and into the bushing and having means for moving the sleeve in the bushing, said plug in said unit engaging the inner wall in said bushing, when the unit is moved inwardly relative to the bushing, and moving relative to the sleeve to compress the spring and cause the O-ring within the sleeve to deform and form a seal between the shaft and unit and cause the O-ring around the plug to be clamped against the end of the sleeve and deformed to seal the unit to the bushing.

2. Means for sealing a gas meter casing having a rotatable shaft projecting therefrom comprising a bushing adapted to be secured to the casing and having a bore therethrough through which the shaft passes, said bore engaging the shaft at the inner end and being enlarged at the outer end to receive a sealing unit, the enlarged portion of the bore being threaded and being connected to the shaft-engaging portion by a tapered surface, said sealing unit comprising a sleeve adapted to fit within the enlarged bore and having a closed outer end having a bore of reduced diameter to engage the shaft, the interior of the sleeve adjacent the bore of reduced diameter being tapered, an O-ring within the sleeve to engage the tapered portion, a washer engaging the O-ring, a spring engaging the washer, a shouldered plug having a bore therein to receive the shaft adapted to be snapped into the other end of the sleeve for limited relative movement, and an O-ring surrounding the plug between the shoulder and the end of the sleeve, said sleeve being inserted over the shaft and into the bushing and having threads engaging the threads in the bushing, said plug in said unit engaging the tapered surface in said bushing, when the unit is threaded into the bushing, and moving relative to the sleeve to compress the spring and cause the O-ring within the sleeve to deform and form a seal between the shaft and unit and cause the O-ring around the bushing to be clamped between the flange on the plug and end of the sleeve to be deformed and seal the sleeve unit to the bushing.

3. Means for sealing a gas meter casing having a rotatable shaft projecting therefrom comprising a bushing adapted to be secured to the casing and having a bore therethrough through which the shaft passes, said bore engaging the shaft at the inner end and being enlarged at the outer end to receive a sealing unit, the enlarged portion of the bore being threaded and being connected to the shaft-engaging portion by an inclined surface, said sealing unit comprising a sleeve adapted to fit within the enlarged bore and having a bore of reduced diameter at the outer end to engage the shaft and having an inclined end surface at the other end, the interior of the sleeve adjacent the bore of reduced diameter being tapered, an O-ring within the bore, a washer engaging the O-ring, a spring engaging the washer, a shouldered plug snapped into the other end of the sleeve for limited relative movement, and an O-ring surrounding the plug between the shoulder and the inclined end of the sleeve, said sleeve being inserted over the shaft and into the bushing and having threads engaging the threads in the bushing, said plug in said unit having a tapered end portion engaging the inclined surface in said bushing, when the unit is threaded into the bushing to be centered and controlled thereby, relative movement of the plug into the sleeve compressing the spring and causing the O-ring within the sleeve to deform and form a seal between the shaft and unit and causing the O-ring around the bushing to be clamped between the flange on the plug and inclined end of the sleeve to seal the sleeve unit to the bushing.

4. Means for sealing a gas meter casing having a rotatable shaft projecting therefrom comprising a bushing on the casing having a bore through which the shaft passes, said bore being of a diameter at the inner end to receive the shaft and being connected by an inclined inner wall to an enlarged portion of the bore at the outer end to receive a sealing unit, said sealing unit comprising a sleeve adapted to fit within the enlarged bore and having a closed outer end provided with a bore of reduced diameter to engage the shaft with the inner surface of the closed outer end inclined to the bore therein, an O-ring within the sleeve surrounding the shaft and engaging the inclined surface of the closed end, a washer within the sleeve engaging the O-ring, a spring engaging the washer, a shouldered plug mounted in the other end of the sleeve for limited relative movement and having a tapered end surface cooperating with the inclined inner wall, and an O-ring surrounding the plug between the shoulder and the end of the sleeve, said unit being inserted over the shaft and into the bushing and having means for moving the sleeve in the bushing, the tapered end surface of said plug in said unit engaging the inclined inner wall in said bushing to properly locate and stabilize the inner end of the unit, said unit when moved inwardly relative to the bushing causing the plug to move relative to the sleeve to compress the spring and cause the O-ring within the sleeve to be pressed by the washer against said inclined surface and be deformed and engage the shaft to form a seal between the rotating shaft and the unit, said relative movement of the plug and sleeve also causing the O-ring around the plug to be clamped between the shoulder on the plug and end of the sleeve and be deformed thereby into engagement with the bushing to form a static seal between the unit and the housing.

5. A sealing unit adapted to be inserted into a bore in a casing to form a seal for a shaft passing therethrough comprising an elongate sleeve having a closed end provided with a bore to receive the shaft and adapted to be positioned over the shaft, means for mounting an O-ring within the sleeve to surround the shaft and engage the closed end, a member slidably mounted in the open end of the sleeve for limited relative movement, said member having an outwardly extending shoulder, and a second O-ring surrounding the member and disposed adjacent the open end of the sleeve, movement of the unit into the bore and the member inwardly in the sleeve causing the first O-ring to be deformed to seal the unit to the shaft and causing the second O-ring to be compressed between the outwardly extending shoulder and the end of the sleeve to distort and seal the unit to the bushing.

6. A sealing unit adapted to be inserted in a bushing to seal a shaft passing through the bushing comprising a sleeve having a closed end provided with a bore to receive the shaft, an O-ring disposed within the sleeve and adapted to surround said shaft and engage the closed end, means including spring means within the sleeve and disposed between the O-ring and a plug slidable in the open end of the sleeve, said plug having an outwardly extending shoulder at the outer end, and a second O-ring surrounding the plug and disposed between the outwardly extending shoulder and the open end of the sleeve, movement of the plug inwardly of the sleeve causing the spring means to apply pressure to the first O-ring and deform the same to seal the unit to the shaft and causing the second O-ring to be compressed between the outwardly extending shoulder and the end of the sleeve to distort and seal the unit to the bushing.

7. A sealing unit adapted to be inserted in a bushing to seal a shaft passing through the bushing comprising a sleeve having a closed end portion provided with a bore to receive the shaft with the inner surface of the end portion inclined toward the bore and an inner shoulder at the other end, an O-ring disposed within the sleeve to surround said shaft and engage the inclined surface, a washer engaging the O-ring, spring means within the sleeve having one end in engagement with the washer, a plug having an outwardly extending shoulder at one end and provided with a bead at the other end adapted to be mounted in the open end of the sleeve for limited relative movement, with the bead being snapped into cooperating relation with the shoulder to maintain the plug therein with said spring engaging the inner end of the plug and normally maintaining the plug in a retracted position, and a second O-ring surrounding the plug and disposed between the outwardly extending shoulder and the end of the sleeve, movement of the plug inwardly of the sleeve from retracted position causing the spring means to be compressed and press the washer against the first O-ring and the O-ring against the inclined surface to deform the O-ing into sealing relation with the shaft and cause the second O-ring to be compressed between the outwardly extending shoulder and the end of the sleeve and to distort and seal the unit to the bushing.

8. A sealing unit adapted to be inserted in a bushing to seal a shaft passing through the bushing comprising a sleeve adapted to be positioned within the bushing and having a closed end provided with a bore to receive the shaft and an inner shoulder at the other end, an O-ring disposed within the sleeve to engage the closed end and adapted to surround said shaft, a washer engaging the O-ring, a spring within the sleeve having one end in engagement with the washer, a plug having a shaft-receiving bore, an outwardly extending shoulder at one end, and a bead at the other end adapted to be mounted in the open end of the sleeve for limited relative movement, said bead being snapped into cooperating relation with the inner shoulder on the sleeve to maintain the plug therein with said spring engaging the inner end of the plug and normally maintaining the plug in a retracted position, and a second O-ring surrounding the plug and disposed between the outwardly evtending shoulder and said other end of the sleeve, movement of the plug inwardly of the sleeve causing the spring to be compressed and the first O-ring to be deformed to seal the unit to the shaft and causing the second O-ring to be compressed between the outwardly extending shoulder and the end of the sleeve to distort and seal the unit to the bushing.

References Cited in the file of this patent

UNITED STATES PATENTS

| | | |
|---|---|---|
| 326,574 | Mars | Sept. 22, 1885 |
| 877,706 | Duffy | Jan. 28, 1908 |

UNITED STATES PATENT OFFICE
CERTIFICATE OF CORRECTION

Patent No. 3,047,298 July 31, 1962

Theodore A. St. Clair et al.

It is hereby certified that error appears in the above numbered patent requiring correction and that the said Letters Patent should read as corrected below.

Column 4, line 42, for "housing" read -- bushing --; column 5, line 25, for "O-ing" read -- O-ring --; column 6, line 17, for "evtending" read -- extending --.

Signed and sealed this 20th day of November 1962.

(SEAL)
Attest:

ERNEST W. SWIDER
Attesting Officer

DAVID L. LADD
Commissioner of Patents